April 25, 1950     O. W. SCHWEITZ     2,505,151
UTILITY REEL
Filed April 10, 1948
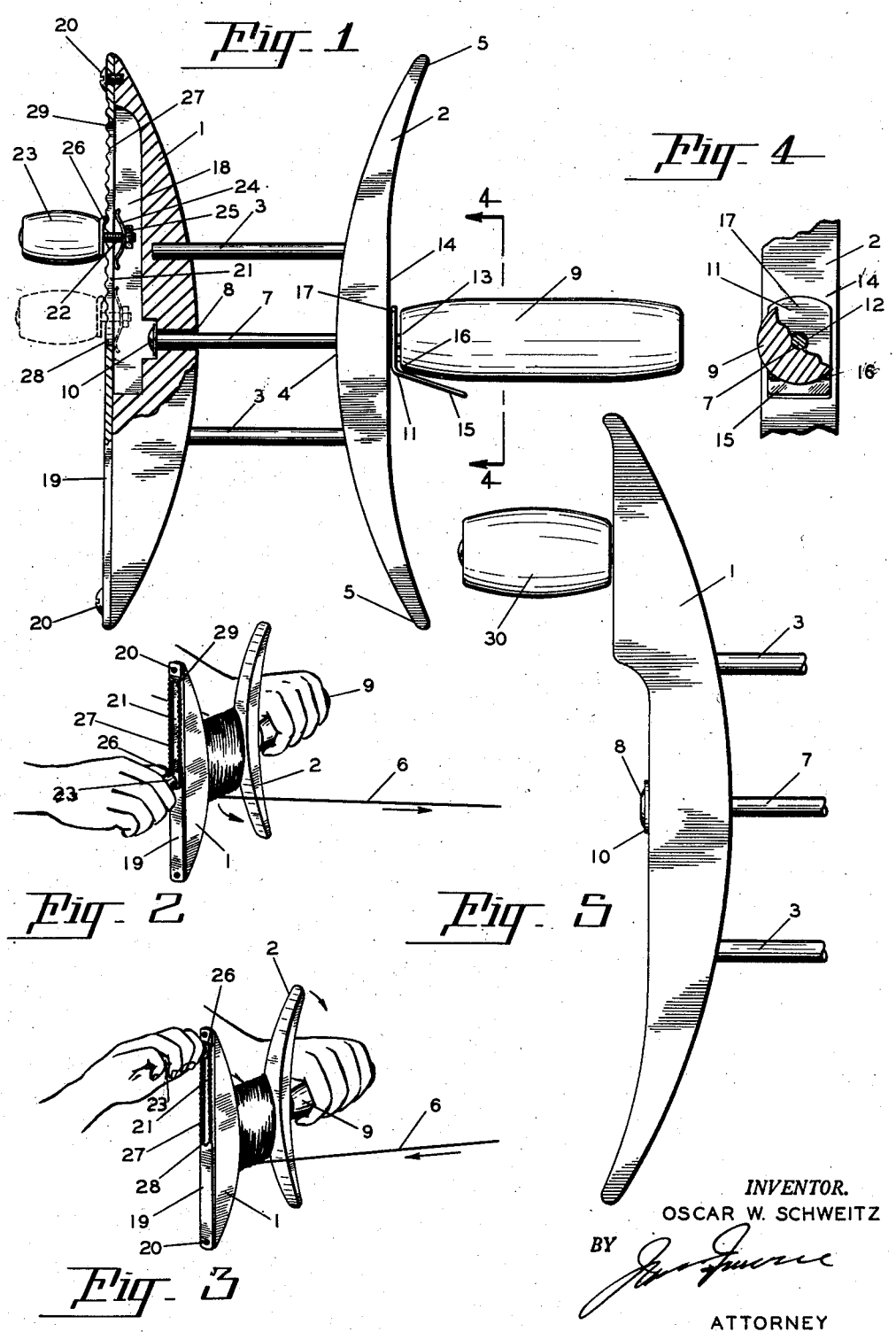
INVENTOR.
OSCAR W. SCHWEITZ
BY
ATTORNEY Patented Apr. 25, 1950

2,505,151

UNITED STATES PATENT OFFICE 2,505,151

UTILITY REEL

Oscar W. Schweitz, Oregon City, Oreg.

Application April 10, 1948, Serial No. 20,192

1 Claim. (Cl. 242—96)

This invention relates to utility reels and is particularly adapted to be used in connection with fish lines, electric cables, ropes and so forth.

My new and improved utility reel is so constructed that it will require a minimum of storage space and that can be operated easily when reeling in or dispensing the line.

The reel is of simple construction, yet providing for considerable capacity. The reel proper is pivotally mounted on a supporting handle and has a crank assembly for rotating the same that is adjustable providing for greater leverages for heavy pulls on lines, or for lesser leverages providing for higher rates of speed. The crank can be centralized relative to the reel providing a pivot about which the reel revolves, giving a double hand hold on the reel when the line is being payed out.

I have also provided a braking feature for applying the brake to the rotation of the reel.

One of the primary objects of my invention is the construction of a reel that can be easily stored away, by reeling the line on the reel in such a manner as to maintain the same in a flat package instead of a circular or round package as is commonly the case with reels.

A further object of the invention is the provision of an adjustable cranking mechanism, so that a leverage on the crank can be increased or decreased, at the same time varying the speed of operation of the reel.

A still further object of my invention is the provision of a means of braking or slowing down the rotation of the reel when the line is being payed out.

Another object of my invention is that the reel is so designed that it can be manufactured easily at a minimum of cost.

These and other incidental objects will be apparent in the drawings, specification and claim.

Referring to the drawings:

Figure 1 is a side view of my new and improved reel having parts broken away for convenience of illustration.

Figure 2 illustrates my reel being used in the operation of paying out the line.

Figure 3 illustrates the reel being used in the reeling in operation of the line.

Figure 4 is a fragmentary detail view of the brake mechanism taken on line 4—4 of Figure 1, parts broken away for illustration.

Figure 5 is a simplified form of construction relative to the crank mounting.

Referring more specifically to the drawings:

My new and improved reel consists of specially shaped side members 1 and 2, spaced apart and secured together by the cross members 3. The inner sides of the members 1 and 2 are curved, being closer together at their central portions 4 than they are at their extremities 5. The object of this curved contour is to direct the line 6 towards and over the cross members 3 while reeling the same on to the reel.

A central cross shaft 7 is rotatably mounted within the members 1 and 2 at 8. A handle 9 is fixedly mounted to the shaft 7, the shaft 7 being maintained within the members 1 and 2 by the flange 10 at its one end, and by the handle 9 at its opposite end. Floating freely on the shaft 7 is a brake shoe 11. The brake shoe 11 has a hole 12 therethrough and through which the shaft 7 passes. This maintains the shoe in position between the end 13 of the handle 9 and the side 14 of the member 2.

Forming part of the brake shoe 11 is a lever 15 which lies adjacent the handle, best illustrated in Figure 1. The brake is applied to the rotation of the member 2 relative to the handle 9 by the operator pulling the lever 15 towards the handle. This tilts the brake shoe 11 so that the point 16 of the shoe will engage the end of the handle at 13 while the point 17 of the shoe will engage the edge 14 of the member 2 causing a binding or pressure action between the member 2 and the end 13 of the handle, applying a braking action to the rotation of the reel.

The member 1 of the reel is cored out at 18, which in turn is covered by the face plate 19, which is secured to the member 1 by the screws 20. Formed in the face plate is a slot 21. This slot is adapted to receive a crankshaft 22 which has a handle 23 rotatably mounted thereon at its outer end. The said shaft passing through the slot 21 and having a spring tension member 24 secured thereon by the locking nut 25.

A dog member 26 is mounted to the shaft 22 and the handle 23. This dog engages the cross slots 27 formed on the face plate 19, the object of which is to position the handle 23 at a desired distance from the center of the reel. After the handle is brought down to the lower end 28 of the slot 21, the handle 23 will be in direct line with the handle 9 acting as a pivot about which the reel will revolve freely as illustrated in Figure 2.

When the handle is moved away from the end 28 of the slot and towards its opposite end 29 rotation may be imparted to the reel. The amount of leverage imparted to the rotation of the reel will depend how far towards the outer end of the slot 21 the handle 23 is moved. When the handle is operated towards the center of the reel, greater speed of rotation may be imparted to the same, but a lesser amount of leverage will be obtained. On the other hand, the farther the handle 23 is moved from the center of the reel the greater will be the leverage and the lesser the speed of operation. This feature makes a very simple adjustment of rotation of the reel and is one of the major objects of my invention.

In Figure 5 I illustrate a reel having the crank 30 permanently located. This reel can be manufactured for less and is simpler of construction, but of course will not perform all of the objects claimed in the above described form of embodiment.

It will be noted in Figures 2 and 3 that the winding on the reel is wound in an elongated form conforming with the shape of the reel. This makes it possible to store the same in a limited amount of space, which is an important feature of my new and improved utility reel construction.

What I claim as new is:

A reel construction comprising a pair of longitudinal bars secured in spaced relation by a pair of rods spaced on opposite sides of the axis of said bars, the inner surfaces of said bars being bowed toward each other, a rod at the axis of the longitudinal bars, a handle secured on the outer end of the rod, a flanged head on the inner end of the rod mounted in a cavity formed in one of the longitudinal bars, a plate on the outer face of the longitudinal bar having the cavity, a slot formed in the plate and registering with the cavity, the plate having corrugations adjacent the side walls of the slot, a bolt extending through the slot with a handle mounted thereon, a resilient member on the bolt to engage the inner surface of the plate each side the slot, a nut for holding the resilient member in contact with the surface of the plate, and a pawl on the bolt between the second-mentioned handle and the corrugated surfaces each side the slot.

OSCAR W. SCHWEITZ.

REFERENCES CITED

The following references are of record in the file of this patent:

UNITED STATES PATENTS

| Number | Name | Date |
|---|---|---|
| 1,455,167 | Joslin | May 15, 1923 |
| 2,078,081 | Kramer | Apr. 20, 1937 |
| 2,434,479 | Allen | Jan. 13, 1948 |